May 24, 1955     F. E. MUNSCHAUER     2,708,993
FLUID OPERATED CLUTCH
Filed April 8, 1950
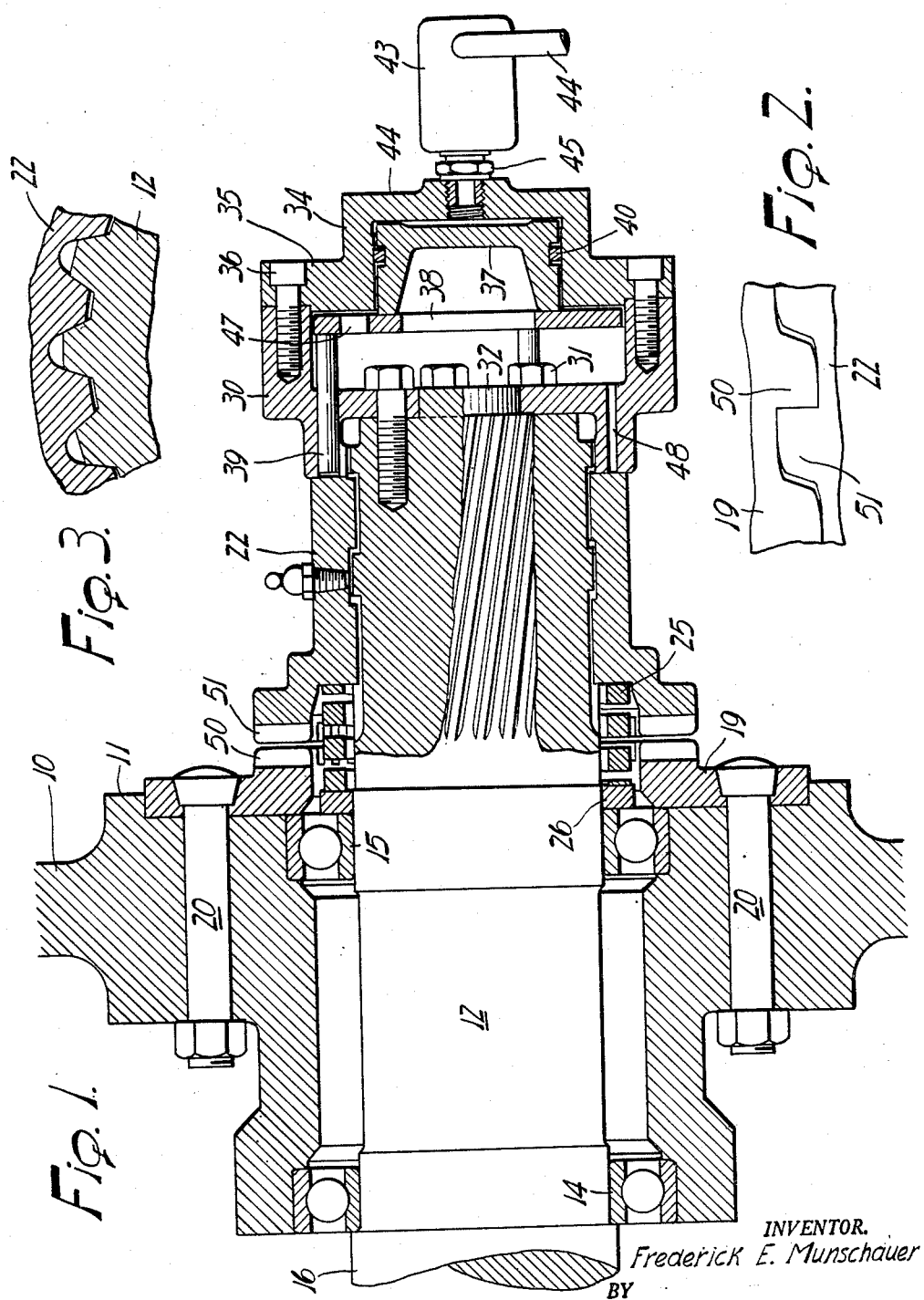
INVENTOR.
Frederick E. Munschauer
BY
Bean, Brooks, Buckley & Bean
ATTORNEYS United States Patent Office 2,708,993
Patented May 24, 1955

2,708,993

FLUID OPERATED CLUTCH

Frederick E. Munschauer, Buffalo, N. Y., assignor to Niagara Machine & Tool Works, Buffalo, N. Y.

Application April 8, 1950, Serial No. 154,807

7 Claims. (Cl. 192—85)

This invention relates to drive means for machinery and particularly to novel connecting and disconnecting means for use in machine power transmission mechanism.

The principles of the present invention may be employed wherever the advantages incident thereto are of value. By way of example, and because the connecting and disconnecting means of the present invention is peculiarly valuable in that field, the present application describes the apparatus in connection with punching and stamping machinery such as punch presses, press brakes, power shears, and the like, where relatively high torques are transmitted through the connecting and disconnecting mechanism. In such machinery positive drive means, usually in the form of a jaw clutch, is highly desirable, and the present invention relates particularly to such connecting and disconnecting means.

Because of the high torques being transmitted, conventional jaw clutch teeth impose very high frictional resistance to disconnection. This is because the actual driving faces of the driving and driven jaw clutch parts are held in abutment by high torque forces. This problem is aggravated in that form of jaw clutch wherein the clutch is biased to disconnected position by spring means and wherein fluid pressure means or the like are provided for moving one of the clutch elements to a position of engagement. In some jaw clutches the clutch is moved to disengagement by operation of a cam carried by the axially movable clutch elements, which cam comes into engagement with a clutch throw-out pin, the clutch being engaged by withdrawing the pin and permitting spring means to move one of the clutch elements axially to connected position. The problem of tooth friction is not so acute in this case where positive mechanical means are provided for effecting disengagement, although even here the normal wear of the clutch teeth may be seriously aggravated by friction of the jaw faces, and clutch failure on this account will thus be accelerated.

In the case of fluid pressure operating clutches the problem is more acute. A mechanical spring is employed for effecting disconnection of the clutch, and there are no serious limitations which prevent the use of a spring of adequate thrust, the only consideration being economy of design. However, the spring force, however great that may be, must be overcome readily and quickly by the fluid pressure means in effecting clutch engagement, and this does impose a serious limitation in design.

It has been proposed to slant the driving and driven faces of the complementary clutch parts backward, to impose or introduce a component of force tending to move the axially movable clutch element to disconnected position. That is, the tangential thrust force is thus acting against an inclined plane and has a component at right angles to the thrust force, parallel to the axis of the clutch and in the direction of disengaging movement of the axially movable clutch part. This reduces the spring force necessary to complete disconnection of the clutch and in turn reduces the force required for the fluid pressure means to overcome the spring force and effect clutch engagement.

However, when the driving and driven faces of the clutch parts are thus given a backward slant or rake, as distinguished from driving faces which lie in planes extending truly radially from the clutch axis, they no longer can be made flat if they are to have full bearing abutment against each other, but must be of some complicated generated form. This problem is analogous to the familiar one which engineers have long recognized in connection with the production of teeth for bevel or crown gears.

The present invention provides means whereby the torque being transmitted through the drive means which urges the clutch faces into contact may be the source of a component of clutch disengaging movement while still using simple flat clutch faces lying in planes which are radial with respect to the axis of the clutch. This is accomplished by using a novel form of key or spline means in constructing and mounting the axially movable clutch element.

Some means must be provided so that the movable clutch element may have free axial movement on the machine drive shaft but is restrained against relative rotative movement thereon. This means usually takes the form of keys or splines extending parallel to the axis of the clutch and acting between the axially movable clutch part and the drive shaft. The present invention proposes slanting these keys or splines so that they extend helically along the peripheral surface of the drive shaft and along the interior of the axially movable clutch part. The helix is of such direction that forces acting between the clutch faces are given a component of disconnecting movement acting against the slidable clutch part, and the helix angle is chosen so that this component, while materially reducing the force necessary to produce clutch disengagement, is not sufficient to produce accidental clutch disengagement by reason of this clutch disengaging component itself.

A single embodiment of the principles of the present invention is illustrated in the accompanying drawing and described in detail in the following specification. This embodiment is by way of example, and the present invention is not limited to that form or otherwise, excepting as defined in the appended claims.

In the drawings:

Fig. 1 is a longitudinal fragmentary central cross-sectional view through one form of the device of the present invention;

Fig. 2 is an enlarged fragmentary plan view showing the jaw tooth formation; and Fig. 3 is an enlarged fragmentary cross-sectional view showing a portion of the spline tooth formations.

Like characters of reference denote like parts in the several views and the numeral 10 designates a flywheel, gear or other driving wheel element having a hub 11. The numeral 12 designates one end portion of a drive shaft which may comprise the crank shaft of a power press or similar machine wherein the shaft is to be intermittently or selectively rotated by connection with the flywheel or other driving wheel 10. While shaft 12 may comprise the crank shaft or eccentric shaft of a punch press, power shear, or like machine, it may be an intermediate shaft having further driving connection with the ultimate driven shaft of the machine.

A pair of anti-friction bearings 14 and 15 support flywheel 10, the inner race of bearing 14 being in abutment with an enlargement 16 of shaft 12 and the outer races of the two bearings being accurately spaced by seating in recesses at opposite ends of the bore in flywheel 10. An annular jaw clutch element 19 is fixed to flywheel 10, and, in the illustrated instance, the flywheel is recessed to receive the clutch element, the latter being secured by means of bolts 20.

A movable clutch element 22 of sleeve form is disposed about drive shaft 12, and the interior of sleeve 22 and the external periphery of drive shaft 12 are provided with cooperating spline formations which cause drive shaft 12 to be driven by and upon rotation of clutch element 22. These spline formations extend helically as shown in Fig. 1, and the operation of the apparatus in this respect will be described more fully later herein.

A compression coil spring 25 encircles shaft 12 and bears at one end against a washer 26, which, in turn, bears against the inner race of anti-friction bearing 15. The other end of spring 25 bears against an adjacent face of clutch element 22 to urge the latter to a position of disengagement with respect to clutch element 19, that being the position illustrated in Fig. 1.

In the form of the present invention illustrated herein by way of example, an adaptor 30 which supports the entire fluid pressure clutch engaging mechanism is secured to the end of shaft 12 by means of screws 31, the shaft 12 having a reduced end portion 32 engaging in a complementary recess in adaptor 30 to accurately locate the same. A cylinder element 34 has an annular flange 35 which is secured against the outer face of adaptor 30 by means of screws 36.

Cylinder 34 receives a piston 37, whose skirt portion bears against a pressure plate 38, which, in turn, bears against a circularly arranged series of pins 39, in the present instance three, which are mounted in adaptor 30 for free axial sliding movement. Piston 37 is provided with packing means 40 and cylinder 34 has an end wall portion 41 to which is fastened a conventional rotary fluid connector 43. The body of the connector 43 remains stationary and is connected with a relatively stationary air pressure supply pipe 44, while an outlet stem portion 45 thereof is freely rotatable relative to the body. The interior details of the connector 43 are not illustrated since such devices are freely available commercially.

It is obvious that the application of air pressure through stem 45 to the interior of cylinder 34 will act against piston 37 and move the piston, the pressure plate 38, and pins 39 to the left as viewed in Fig. 1, thus moving clutch element 22 into engagement with clutch element 19 against the resistance of compression spring 25. Pressure plate 38 is provided with a series of openings 47 to avoid trapping air to the right of the pressure plate which would retard the releasing action of the clutch when air pressure is cut off. Also, a series of vent openings 48 permits egress of air from the interior of adaptor 30 when piston 37 moves to the left as viewed in Fig. 1.

It will be noted that the air pressure from stem 45 acts immediately and directly against the center of the head of piston 34, thus insuring the fastest possible response of clutch element 22 when the clutch is to be engaged.

Fig. 2 illustrates portions of clutch elements 19 and 22 in fragmentary elevation to show the tooth profile. Referring to Fig. 2, driving and driven clutch elements 19 and 22, respectively, have interengaging teeth 50 and 51. It will be noted that the driving faces of teeth 50 and 51 extend in the same direction as the axis of the clutch and are in fact portions of planes lying along and extending radially from the clutch axis.

The direction in which the spline formations of drive shaft 12 and clutch element 22 extend helically in Fig. 1, is such that, with the flywheel 10 rotating in a counterclockwise direction as viewed from the right-hand side of Fig. 1, the spline formations act as inclined planes. The helix angle as illustrated is about twelve degrees but this angle will vary according to design and other requirements. In any event the component is materially less than the force of friction between the driving faces of the teeth when the drive shaft is under load, so that accidental failure of air pressure will not cause immediate clutch disengagement.

However, the component may closely approach the force of friction present in the clutch faces and the splines at the end of a press stroke, when the drive shaft is under no working load, to materially lessen the force required on the part of spring 25. This in turn greatly decreases the burden placed upon piston 37 in overcoming the resistance of spring 25 in clutch engaging operations. The foregoing arrangement reduces wear on the clutch teeth or jaws incident to clutch disengagement.

Spring 25 is pre-loaded by the assembling of clutch element 22 and adaptor 30 so that it acts at all times to retain the inner race of bearing 14 against abutment 16 and to retain the outer faces of both bearings in securely assembled relation in their seats in hub 11 of flywheel 10. The supply pipe 44 will, of course, have therein conventional control valve means which may selectively be manipulated at the will of the operator to apply or not apply air pressure to cylinder 41.

It will be noted that clutch element 22 will have a slight rotative movement as an accompaniment to axial movement along the splines of drive shaft 12, but this rotation is insignificant in amount and effect.

What is claimed is:

1. Drive means for power presses, shears and like machines comprising a drive shaft, a drive wheel having rotatable bearing on said shaft, means rotating said drive wheel in a given direction, an annular jaw clutch element fixed to said wheel, an annular axially slidable complementary jaw clutch element mounted on said drive shaft and movable toward and away from the fixed jaw clutch element, compression coil spring means acting against the slidable clutch element to urge the same axially away from the fixed clutch element, fluid motor means selectively operable to overcome the spring means and move the slidable clutch element axially into engagement with the fixed clutch element for rotation therewith in said given direction, and spline means between the slidable clutch element and the drive shaft, said spline means extending helically in the angular direction of driving rotation of the clutch elements with respect to the axial direction of disengaging movement.

2. Drive means for power presses, shears and like machines comprising rotary driving and driven elements, means rotating said driving element in a given direction, an annular jaw clutch element fixed to one of said elements, an annular axially slidable complementary jaw clutch element movable toward and away from the fixed jaw clutch element, compression coil spring means acting against the slidable clutch element to urge the same axially away from the fixed clutch element, fluid motor means selectively operable to overcome the spring means and move the slidable clutch element axially into engagement with the fixed clutch element for rotation therewith in said given direction, and spline means between the slidable clutch element and the other of said driving and driven elements, said spline means extending helically in the angular direction of driving rotation of the clutch elements with respect to the axial direction of disengaging movement.

3. Drive means for power presses, shears and like machines comprising a drive shaft, a drive wheel having rotatable bearing on said shaft, means rotating said drive wheel in a given direction, an annular jaw clutch element fixed to said wheel, an annular axially slidable complementary jaw clutch element mounted on said drive shaft and movable toward and away from the fixed jaw clutch element, compression coil spring means acting against the slidable clutch element to urge the same axially away from the fixed clutch element, fluid motor means selectively operable to overcome the spring means and move the slidable clutch element axially into engagement with the fixed clutch element for rotation therewith in said given direction, and spline means between the slidable clutch element and the drive shaft, said spline means extending helically away from the fixed clutch element in the direction of driving rotation of the clutch elements.

4. Drive means for power presses, shears and like machines comprising rotary driving and driven elements, means rotating said driving element in a given direction, a jaw clutch element fixed to one of said elements, an axially slidable complementary jaw clutch element movable toward and away from the fixed jaw clutch element, compression coil spring means acting against the slidable clutch element to urge the same axially away from the fixed clutch element, fluid motor means selectively operable to overcome the spring means and move the slidable clutch element axially into engagement with the fixed clutch element for rotation therewith in said given direction, and spline means between the slidable clutch element and the other of said driving and driven elements, said spline means extending helically away from the fixed clutch element in the direction of driving rotation of the clutch elements.

5. Drive means for power presses, shears and like machines comprising a drive shaft, a drive wheel having rotatable bearing on said shaft, means rotating said drive wheel in a given direction, a jaw clutch element fixed to said wheel, an axially slidable complementary jaw clutch element mounted on said drive shaft and movable toward and away from the fixed jaw clutch element, compression coil spring means acting against the slidable clutch element to urge the same axially away from the fixed clutch element, fluid motor means selectively operable to overcome the spring means and move the slidable clutch element axially into engagement with the fixed clutch element for rotation therewith in said given direction, and spline means between the slidable clutch element and the drive shaft, said spline means extending helically in the angular direction of driving rotation of the clutch elements with respect to the axial direction of disengaging movement.

6. Drive means for power presses, shears and like machines comprising a drive shaft, a drive wheel having rotatable bearing on said shaft, means rotating said drive wheel in a given direction, an annular jaw clutch element fixed to said wheel, an annular axially slidable complementary jaw clutch element mounted on said drive shaft and movable toward and away from the fixed jaw clutch element, compression coil spring means acting against the slidable clutch element to urge the same axially away from the fixed clutch element, fluid motor means selectively operable to overcome the spring means and move the slidable clutch element axially into engagement with the fixed clutch element for rotation therewith in said given direction, an oblique slide guide connection between the movable clutch element and the drive shaft whereby axial disengaging movement of the movable clutch element is accompanied by limited guided rotary movement thereof relative to the drive shaft in the direction of driving rotation.

7. Drive means for power presses, shears and like machines comprising rotary driving and driven elements, means rotating said driving element in a given direction, a jaw clutch element fixed to one of said elements, an axially slidable complementary jaw clutch element movable toward and away from the fixed jaw clutch element, compression coil spring means acting against the slidable clutch element to urge the same axially away from the fixed clutch element, fluid motor means selectively operable to overcome the spring means and move the slidable clutch element axially into engagement with the fixed clutch element for rotation therewith in said given direction, an oblique slide guide connection between the movable clutch element and the other of said driving and driven elements whereby axial disengaging movement of the movable clutch element is accompanied by limited guided rotary movement of the clutch element relative to said other element in the direction of driving rotation.

References Cited in the file of this patent

UNITED STATES PATENTS

| Number | Name | Date |
|---|---|---|
| Re. 13,893 | Ireland | Mar. 23, 1915 |
| 746,761 | Taylor | Dec. 15, 1903 |
| 1,505,509 | Turney | Aug. 19, 1924 |
| 1,758,370 | Olsen et al | May 13, 1930 |
| 1,904,563 | Strout | Apr. 18, 1933 |
| 1,938,780 | Nenninger et al. | Dec. 12, 1933 |
| 2,062,930 | Pritchard | Dec. 1, 1936 |
| 2,163,514 | Farren | June 20, 1939 |
| 2,202,271 | Sinclair et al. | May 28, 1940 |
| 2,223,535 | Sinclair | Dec. 3, 1940 |
| 2,352,140 | Trott | June 20, 1944 |
| 2,419,890 | Freeborn | Apr. 29, 1947 |
| 2,548,268 | Metsger | Apr. 10, 1951 |
| 2,620,054 | Munschauer | Dec. 2, 1952 |